United States Patent [19]

Blount

[11] 4,339,366
[45] Jul. 13, 1982

[54] PROCESS FOR THE PRODUCTION OF POLYESTER RESINS

[76] Inventor: David H. Blount, 5450 Lea St., San Diego, Calif. 92105

[21] Appl. No.: 319,144

[22] Filed: Nov. 9, 1981

Related U.S. Application Data

[63] Continuation-in-part of Ser. No. 207,391, Nov. 17, 1980, which is a continuation-in-part of Ser. No. 134,975, Mar. 30, 1980, which is a continuation-in-part of Ser. No. 13,139, Feb. 21, 1979, Pat. No. 4,226,982.

[51] Int. Cl.$^3$ .............................................. C08L 1/00
[52] U.S. Cl. .................... 527/100; 521/100; 521/109; 521/154; 528/44; 527/300; 527/311; 527/105; 527/103; 527/305; 527/313; 527/314

[58] Field of Search ................ 260/9, 17.4 R, 17.4 Cl, 260/22 CB, 22 XA, 29.2 E, 29.6 S, 29.7 S; 521/100, 109, 154; 528/44

[56] References Cited

U.S. PATENT DOCUMENTS

| | | | |
|---|---|---|---|
| 4,260,696 | 4/1981 | Blount | 521/154 |
| 4,281,110 | 7/1981 | Blount | 521/154 |
| 4,283,311 | 8/1981 | Blount | 521/175 |

*Primary Examiner*—Morton Foelak

[57] ABSTRACT

Polyester resins are produced by chemically reacting a broken-down alkali metal lignin-cellulose polymer, a substituted organic hydroxy compound and a polycarboxylic acid compound and/or a polycarboxylic acid anhydride. Polyester resins may be used as molding powder, as coating agents and to produce polyurethane foams.

17 Claims, No Drawings

PROCESS FOR THE PRODUCTION OF POLYESTER RESINS

CROSS-REFERENCE TO RELATED COPENDING APPLICATIONS

This application is a continuation-in-part of my copending U. S. patent application, Ser. No. 207,391, filed on Nov. 17, 1980, which is a continuation-in-part of my copending U. S. patent application, Ser. No. 134,975, filed on Mar. 30, 1980, which is a continuation-in-part of my copending U. S. patent application, Ser. No. 13,139, filed on Feb. 21, 1979, now U. S. Pat. No. 4,226,982.

BACKGROUND OF THE INVENTION

This invention relates to a process for the production of polyester resinous products produced by chemically reacting a broken-down alkali metal lignin-cellulose polymer, a substituted organic hydroxy compound and a polycarboxylic acid and/or polycarboxylic acid anhydride. When an unsaturated polyester resin is to be produced, an unsaturated substituted organic hydroxy compound or an unsaturated polycarboxylic acid and/an polycarboxylic acid anhydride may be used in the reactive mixture.

The polyester resinous product may be utilized as a protective coating for wood, metal, plastics, linoleum, leather, fabric and rubber. They may be utilized in paints, lacquers, metal primers, caulking compounds and water-emulsion paints. The unsaturated polyester resinous products, when copolymerized with a polymerizable organic compound, will produce hard, solid, useful objects or they may be used in conjunction with a reinforcing filler such as fiberglas fibers, paper or cloth to produce a laminate of outstanding strength and durability. They may also be used as a molding powder, as an adhesive and as impregnants. These resinous products may be further reacted with epihalohydrins and polyisocyanate compounds to produce resinous products and foams.

Polyester resinous products may be modified with vegetable oils, vinyl monomers, aminoplasts, phenoplasts, phenol, melamine, silicone resins, silicone silicate resins, cellulose nitrate, polyisocyanates, cyclopentadienes, terpenes, monobasic acids, e.g., benzoic acid and p-tert-butyl benzoic acid; may be modified with natural resins, ethyl cellulose, chlorinated rubber, aldehyde phenol silicate resins, aldehydes, polyhydroxyl compounds and other synthetic and modified natural resins. The useful vinyl monomers include styrene, acrylates, methacrylates, acrylonitrile, and mixtures thereof.

Polyester resinous products may be produced by reacting the following components:
(a) Broken-down alkali metal lignin-cellulose polymer and/or broken-down cellulose polymer;
(b) Substituted organic hydroxy compound which contains at least one substitute which will split off in the reaction;
(c) Polycarboxylic acid and/or polycarboxylic acid anhydride.

Component (a)

Component (a), a broken-down alkali metal lignin-cellulose product, is produced by the processes outlined in my copending U. S. patent application, Ser. No. 13,139, filed on Feb. 21, 1979, now U. S. Pat. No. 4,226,982, and is incorporated into this invention.

Water-soluble, broken-down, alkali metal lignin-cellulose polymers and carbohydrates are produced by mixing 3 parts by weight of a cellulose-containing plant or plant derivative and 2 to 5 parts by weight of a melted alkali metal hydroxide, then maintaining the temperature of the mixture at 150° C. to 220° C. while agitating for 5 to 60 minutes.

Any suitable plant or the products of plants which contain cellulose may be used in this invention. The plant material is preferred to be in the form of small dry particles such as sawdust. Suitable plants include, but are not limited to, trees, bushes, agricultural plants, weeds, vines, straw, flowers, kelp, algae and mixtures thereof. Wood is the preferred plant. Commercial and agricultural waste products may be used, such as stalks, paper, cotton clothes, bagasses, etc. Wood fibers (wood pulp) with lignin removed may be used in this invention. Plants that have been partially decomposed, such as humus, peat, certain soft brown coal, manure containing cellulose, etc., may also be used in this invention.

Any suitable alkali metal hydroxide may be used in this invention. Suitable alkali metal hydroxides include sodium hydroxide, potassium hydroxide and mixtures thereof. Sodium hydroxide is the preferred alkali metal hydroxide.

The novel broken-down water-soluble alkali metal lignin-cellulose polymer produced by the process of this invention differs from the alkali cellulose polymers produced by the known processes. The broken-down alkali metal lignin-cellulose polymer is dark-brown to black in color, has at least one —COH radical removed from each cellulose molecule, the usual lignin-cellulose bond is not broken in most of the cases and the cellulose molecules are broken down into smaller molecules of alkali metal broken-down lignin-cellulose which are water-soluble. When a cellulose polymer such as cotton or wood with the lignin removed is reacted with an alkali metal hydroxide by the process of this invention, a black water-soluble broken-down alkali metal cellulose polymer is produced; this polymer may be reacted with a mineral acid until the pH is about 6 and a black, foamed, brokendown cellulose resinous product and carbohydrates are produced. The foam is produced by the release of $CO_2$ which was removed from the cellulose polymer. When a mineral acid is added to an aqueous solution of the broken-down alkali metal lignin-cellulose polymer until the pH is about 6, a black resinous product floats to the top and is recovered and the carbohydrates are in the solution.

Component (b)

Any suitable organic monohydroxy compound having a substituent which will split off during the reaction. The substituent can be halogen, acid sulfate, nitrate, acid phosphate, bicarbonate, sulfate, formate, acetate, propionate, laurate, oleate, stearate, and mixtures thereof.

The halohydrins are the preferred organic monohydroxy-substituted compound. Suitable halohydrins include the alkene halohydrins such as ethylene chlorohydrin, ethylene bromohydrin, glycerine α, γ dichlorohydrin and the like.

Aliphatic nitro alcohols are produced by reacting nitroalkanes with aldehydes or ketones in the presence of dilute alkali to produce compounds with the general formula of:

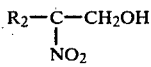

wherein R is an alkane. 2-nitro-1-hydroxy alkane compounds may be used. Nitro-phenols may be used.

Component (c)

the polycarboxylic acid may be aliphatic, cycloaliphatic, aromatic and/or heterocyclic and may be substituted, e.g., with halogen atoms and may be unsaturated; examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric acid, fatty acid such as oleic acid, optionally mixed with monomeric fatty acids, di-methylterephthalate and bis-glycol terephthalate.

Long-chain unsaturated polyester resins may be made from dibasic acids and dihydric alcohols. Either the dibasic acid or the dihydric alcohol may be unsaturated. Usually a combination of unsaturated and saturated bibasic acids and dihydric alcohols is used to produce the unsaturated polyester resins. Instead of the dibasic acids, the corresponding polycarboxylic acid esters of lower alcohols or their mixtures may be used for preparing the unsaturated polyester resins.

An unsaturated dibasic acid such as maleic acid, maleic acid anhydride, fumaric acid, itaconic acid or mixtures thereof must be included in the production of unsaturated polyester resins, except when an unsaturated alcohol is used.

A portion, up to 50% by weight, of the polycarboxylic acid and/or polycarboxylic acid anhydride may be replaced by polymerable oils such as unsaturated fatty acids (or their esters), tung oil, linseed oil, heated linseed oil, soybean oil, dehydrated castor oil, tall oil, cottonseed oil, sunflower oil, fish oil, perilla oil, safflower oil and mixtures thereof.

A portion, up to 50% by weight, of the polycarboxylic acid and/or polycarboxylic acid anhydride may be replaced with a linear organic carbonate selected from the group consisting of p-xylene glycol bis(ethyl carbonate), diethylene glycol bis(allyl carbonate) and mixtures thereof.

A portion, up to 50% by weight, of the substituted organic monohydroxy compound and polycarboxylic acid is replaced with an organic compound containing hydroxyl and carboxylic radicals, selected from the group consisting of 10-hydroxy undecanoic acid, 2-hydroxy decanoic acid, ω-hydroxy pentadecanoic acid and mixtures thereof.

Any suitable polymerizing monomer may be used with the unsaturated polyester resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc. The vinyl monomer may be added in an amount of up to 50% by weight, percentage based on the weight of the polyester silicate resinous product.

Activators and promoters, used in conjunction with the initiators such as cobalt which, in the form of its ethyl hexanoate or naphthanate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such a p-tert-butyl catechol, hydroquinone, p-nitrose dimethylaniline or similar compounds, which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate and mixtures thereof. The amount of organic peroxide needed to promote the catalytic reaction is quite varied; usually less than 1%, based on the weight of the reactants, is needed. Methyl ethyl ketone peroxide is added in an amount of 0.2 to 0.1% by weight, based on weight of the polyester resinous product.

Any suitable polyhydric alcohol may be used such as, for example, ethylene glycol; propylene-1,2- and -1,3-glycol; butylene-1,4- and -2,3-glycol; hexane-1,6-diol; octane-1,8- diol; neopentyl glycol; cyclohexanedimethanol (1,4-bis-hydroxy-methylcyclohexane); 2- methylpropane-1,3-diol; glycerol; tri-methylol propane; hexane-1,2,6-triol; butane-1,2,4-triol; trimethylol ethane, pentaerythritol; quinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as c-caprolactone, or hydroxycarboxylic acid such as ω-hydroxycaproic acid, may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of BF₃, or by addition of these epoxides, optionally as mixtures or successively, to starting components which contain reactive hydrogen atoms such as alcohols or amines, e.g., water, ethylene glycol; propylene-1,3- or 1,2-glycol; trimethylol propane; 4,4-dihydroxydiphenylpropane; aniline, ammonia, ethanolamine or ethylenediamine; sucrose polyethers such as those described, e.g., in German Auslegeschriften Nos. 1,176,358 and 1,064,938 may also be used according to the invention. It is frequently preferred to use polyethers which contain predominantly primarily OH groups (up to 90% by weight, based on the total OH groups contained in the polyether). Polyethers modified with vinyl polymers such as those which may be obtained by polymerizing styrene or acrylonitrites in the presence of polyethers (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenyl-methylmethane, hexanediol, and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products of alkylene oxides with phenol formaldehyde resins or with urea-formaldehyde resins are also suitable for the purpose of the invention.

Polyhydric alcohols of lower molecular weight are preferred, such as ethylene glycol, diethylene glycol and propylene glycol.

Any suitable aldehyde compound may be reacted with the broken-down alkali metal lignin-cellulose polymer, then with a substituted organic hydroxy compound or may be reacted at the same time that the substituted organic hydroxy compound is reacting with the alkali metal lignin-cellulose polymer and polycarboxylic acid. Suitable aldehydes include, but are not limited to, formaldehyde, acetaldehyde, propionic aldehyde, furfural, crotonaldehyde, acrolein, butyl aldehyde, paraformaldehyde, pentanals, hexanals, heptanals and mixtures thereof in the ratio of 1 to 5 parts by weight of the aldehyde to 2 parts by weight of the broken-down alkali metal lignin-cellulose polymer. The aldehyde is mixed with the water-soluble broken-down alkali metal lignin-cellulose polymer, then agitated at a temperature between ambient temperature and the boiling temperature of the aldehyde and at ambient pressure for 10 to 120 minutes, thereby producing an aldehyde alkali metal lignin-cellulose polymer. The aldehyde-alkali metal lignin-cellulose polymer is then mixed with a substituted organic hydroxy compound having a substituent which will split off during the reaction, to said aldehyde-alkali metal lignin-cellulos polymer in the amount wherein the mols of the substituted radicals are about equal to the mols of the alkali radicals in the mixture, then heated to a temperature between ambient temperature and the boiling temperature of the reactants while agitating at an ambient pressure to 1500 psi for about 30 minutes; the reaction is complete in 30 minutes to 8 hours, thereby producing a broken-down organic lignin-cellulose polymer.

Any suitable organic compound that will react with the broken-down alkali metal cellulose polymer may be used. Preferred is an organic compound, having at least one carbon atom which is attached to a substituent, which is split off during the reaction. These organic compounds which are the reactants used in the preparation of broken-down cellulose copolymers have the graphical skeleton carbon structure of $$X-C-C-X$$

where $$-C-C-$$

represents two adjacent carbon atoms, or $$X-C-R-CX$$

where X and X represent the substituents which split off during the reaction. The R between the pair of reactive carbon atoms is selected from the following groups: Saturated straight-chain carbon atoms, unsaturated carbon atoms, either linkages, aromatic structures and others, for it is to be understood that other intervening structures may be employed. The X and X substituents can be halogen, acid sulfate, nitrate, acid phosphate, bicarbonate, formate, acetate, propionate, laurate, oleate, stearate, oxalate, acid malonate, acid tartrate, acid citrate and others.

The organic compounds which have the graphical skeleton carbon structure of $$R-\underset{\underset{R'}{|}}{\overset{\overset{R''}{|}}{C}}-X$$

where X represents the substituents which split off during the reaction may be used in this invention. The R, R' and R" are selected from the following groups: Hydrogen, saturated straight-chain carbon atoms, unsaturated carbon atoms, ether linkages, aromatic structures, another X and others, for it is to be understood that other structures may be employed. The X substituents can be halogen, acid sulfate, nitrate, acid phosphate, bicarbonate, sulfate formate, acetate, propionate, laurate, oleate, stearate, acid oxalate, acid malonate, acid tartrate, acid citrate, mixtures thereof and others.

Suitable substituted organic compounds include, but are not limited to, substituted alkyl compounds such as methyl halides such as methyl chloride, methyl bromide, methyl iodide, etc., methyl sulfate, methyl hydrogen sulfate, methyl hydrogen phosphate, methyl nitrate; ethyl halides such as ethyl chloride, ethyl bromide, ethyl iodide, etc., ethyl hydrogen sulfate, ethyl sulfate, ethyl hydrogen phosphate, ethyl nitrate, ethyl oxalate;

propyl halides, propyl hydrogen sulfate, 1-nitropropane, 2-nitropropane, propyl hydrogen phosphate; butyl halides, butyl hydrogen sulfate, 2-nitro-1-butanol, butyl hydrogen phosphate, etc.; substituted unsaturated compounds such as vinyl chloride, vinyl bromide, vinyl acetate, vinylidine chloride; substituted carboxylic acids such as chloroacetic acid, dichloroacetic acid, sodium chloroacetate, bromoacetic acid, iodoacetic acid, γ-chloropropionic acid, α-chlorobutyric acid, etc.; acid chlorides such as acetyl chloride, acetyl bromide, propionyl chloride, n-butyryl chloride, chloroacetic chloride, etc.; substituted allyl halides such as allyl halide, methyl allyl halide, etc.; carboxyl acid anhydrides such as acetic anhydride, propionic anhydride, n-butyric anhydride, isobutyric anhydride, etc.; organic esters such as ethyl acetate, methyl propionate, propyl formate, methyl formate, ethyl formate, methyl acetate, n-butyl acetate, ethyl chloroacetate, etc.; and substituted hydroxyl.

Some of the useful halogenated compounds include methylene chloride or bromide, ethylene dichloride, ethylene dibromide, propylene dichloride or dibromide, epihalohydrins, dihalides of unsaturated hydrocarbon gases derived from pressure-cracking processes, natural gas-cracking processes as well as compounds having more than two substituents such as 1,1,2-trichloroethane; 1,2,4-trichlorobutane; 1,2,3,4-tetrachlorobutane; trichloromesitylene and the like. Mixtures of these compounds may be used in this process.

Any suitable inorganic or organic solvent may be used in this invention. Suitable solvents include, but are not limited to, water, alcohols such as methyl alcohol, ethyl alcohol, isopropyl alcohol and propyl alcohol.

Any suitable salt-forming compound may be used in this invention to react with the broken-down alkali metal lignin-cellulose polymer. Suitable salt-forming compounds include mineral acids such as hydrochloric acid, sulfuric acid and nitric acid, organic acid such as acetic acid, propionic acid, etc., and hydrogen-containing acid salts such as sodium hydrogen sulfate, potassium hydrogen sulfate, sodium dihydrogen phosphate and potassium dihydrogen phosphate, and mixtures thereof.

The polyester resinous products of this invention will react with polyisocyanates such as crude MDI to produce resinous products which may be used as adhesives, putty caulking agents, etc., and foams which may be used for thermal and sound insulation.

Any suitable organic polyisocyanate may be used according to the invention, including aliphatic, cycloaliphatic, araliphatic, aromatic and heterocyclic polyisocyanates and mixtures thereof. Suitable polyisocyanates which may be employed in the process of the invention are exemplified by the organic diisocyanates which are compounds of the general formula:

$$O=C=N-R-N=C=O$$

wherein R is a divalent organic radical such as an alkylene, aralkylene or arylene radical. Such suitable radicals may contain, for example, 2 to 20 carbon atoms. Examples of such diisocyanates are:
tolylene diisocyanate,
p,p'-diphenylmethane diisocyanate,
phenylene diisocyanate,
m-xylylene diisocyanate,
chlorophenylene diisocyanate,
benzidene diisocyanate,
naphthylene diisocyanate,
decamethylene diisocyanate,
hexamethylene diisocyanate,
pentamethylene diisocyanate,
tetramethylene diisocyanate,
thiodipropyl diisocyanate,
propylene diisocyanate, and
ethylene diisocyanate.

Other polyisocyanates, polyisothiocyanates and their derivatives may be equally employed. Fatty diisocyanates are also suitable and have the general formula:

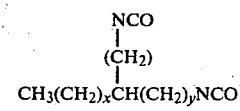

where x+y totals 6 to 22 and z is 0 to 2, e.g., isocyanastearyl isocyanate.

It is generally preferred to use commercially readily-available polyisocyanates, e.g., tolylene-2,4- and -2,6-diisocyanate and any mixtures of these isomers, commercially known as "TDI"; polyphenylpolymethylene-isocyanates obtained by aniline-formaldehyde condensation followed by phosgenation, commercially known as "crude MDI"; and modified polyisocyanate containing carbodiimide groups, allophanate groups, isocyanurate groups, urea groups, imide groups, amide groups or biuret groups, said modified polyisocyanates prepared by modifying organic polyisocyanates thermally or catalytically by air, water, urethanes, alcohols, amides, amines, carboxylic acids, or carboxylic acid anhydrides, phosgenation products of condensates or aniline or anilines alkyl-substituted on the nucleus with formaldehydes or ketones may be used in this invention. Solutions of distillation residues accumulating during the production of tolylene diisocyanates, diphenyl methane diisocyanates, or hexamethylene diisocyanate, in monomeric polyisocyanates or in organic solvents or mixtures thereof may be used in this invention. Organic triisocyanates such as triphenylmethane triisocyanate may be used in this invention. Cycloaliphatic polyisocyanates, e.g., cyclohexylene-1,2-; cyclohexylene-1,4-; and methylene-bis-(cyclohexyl-4,4'-) diisocyanate may be used in this invention. Suitable polyisocyanates which may be used according to the invention are described by W. Siefkin in Justus Liebigs Annalen der Chemie, 562, pages 75 to 136. Inorganic polyisocyanates are also suitable according to the invention.

Organic polyhydroxyl compounds (polyols) may be used in this invention with polyisocyanates or may be first reacted with a polyisocyanate to produce isocyanate-terminated polyurethane prepolymers and then also be used in this invention.

Reaction products of from 50 to 99 mols of aromatic diisocyanates with from 1 to 50 mols of conventional organic compounds with a molecular weight of, generally, from about 200 to about 10,000 which contain at least two hydrogen atoms capable of reacting with isocyanates, may also be used. While compounds which contain amino groups, thiol groups, carboxyl groups or silicate groups may be used, it is preferred to use organic polyhydroxyl compounds, in particular, compounds which contain from 2 to 8 hydroxyl groups, especially those with a molecular weight of from about 800 to about 10,000 and, preferably, from about 1,000 to about 6,000, e.g., polyesters, polyethers, polythioethers, polyacetals, polycarbonates or polyester amides containing at least 2, generally from 2 to 8, but, preferably, dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or heterocyclic and may be substituted, e.g., with halogen atoms and may be unsaturated. Examples include: Succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate. Any suitable polyhydric alcohol may be used, such as, for example, ethylene glycol, propylene-1,2- and -1,2-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; glycerol; trimethylol propane; hexane-1,2,6-triol; butane-1,2,4-triol; trimethylol ethane; pentaerythritol; quinitol; mannitol and sorbitol; methylglycoside; diethylene glycol; triethylene glycol; tetra ethylene glycol; polyethylene glycols; dipropylene glycol; polypropylene glycols; dibutylene glycol and polybutylene glycols. The polyesters may also contain a proportion of carboxyl end groups. Polyesters of lactones such as c-caprolactone, or hydroxycarboxylic acid such as c-hydroxycaproic acid may also be used.

The polyethers with at least 2, generally from 2 to 8 and, preferably, 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of $BF_3$ or by addition of these epoxides, optionally as mixtures or successively, to starting components which contain reactive hydrogen atoms such as alcohols or amines, e.g., water, ethylene glycol; propylene-1,3- or -1,2-glycol; trimethylol propane; 4,4-dihydroxydiphenylpropane; aniline; ammonia; ethanolamine or ethylenediamine; sucrose polyethers, such as those described in German Auslegeschrifren Nos. 1,176,358 and 1,064,938, may also be used according to the invention. It is frequently preferred to use polyethers which contain, predominantly, primarily OH groups (up to 90% by weight, based on the total OH groups contained in the polyether). Polyethers modified with vinyl polymers such as those which may be obtained by polymerizing styrene or acrylonitrites in the presence of polyethers, (U.S. Pat. Nos. 3,383,351; 3,304,273; 3,523,093 and 3,110,695; and German Patent No. 1,152,536) and polybutadienes which contain OH groups are also suitable.

By "polythioethers" are meant, in particular, the condensation products of thiodiglycol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4'-dihydroxydiphenylmethylemethane, hexanediol and formaldehyde. Polyacetals suitable for the invention may also be prepared by the polymerization of cyclic acetals.

The polycarbonates with hydroxyl groups used may be of the kind, e.g., which may be prepared by reaction diols, e.g., propane-1,3-diol; butane-1,4-diol; and/or hexane-1,6-diol or diethylene glycol, triethylene glycol or tetraethylene glycol, with diarylcarbonates, e.g., diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, wood particles, cellulose, modified cellulose, carbohydrates and starches, may also be used. Additional products of alkylene oxides with phenol formaldehyde resins or with urea-formaldehyde resins are also suitable for the purpose of the invention.

Organic hydroxyl silicate compound as produced in U.S. Pat. No. 4,139,549 may also be used in this invention to react with the polyisocyanates.

Examples of these compounds which are to be used according to the invention have been described in High Polymers, Volume XVI, "Polyurethanes, Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966, on pages 45 to 71.

If the polyisocyanates or the prepolymer which contains NCO groups have a viscosity above 2000 cP at 25° C., it may be advantageous to reduce the viscosity thereof by mixing it with a low-viscosity organic polyisocyanate and/or an inert blowing agent or solvent.

Inorganic polyisocyanates and isocyanate-terminated polyurethane silicate prepolymers may also be used in this invention.

Polyisocyanate curing agents and/or polyisocyanate activators (catalysts) may be used in the process of producing polyurethane resinous or foamed products. The following are examples of polyisocyanate curing agents and activators:

1. Water.
2. Water containing 10% to 70% by weight of an alkali metal silicate, such as sodium and/or potassium silicate. Crude commercial alkali metal silicate may contain other substances, e.g., calcium silicate, magnesium silicate, borates or aluminates and may also be used. The molar ratio of alkali metal oxide to $SiO_2$ is not critical and may vary within the usual limits, but is preferably between 4 to 1 and 0.2 to 1.
3. Water containing 20% to 50% by weight of ammonium silicate.
4. Water containing 5% to 40% by weight of magnesium oxide in the form of a colloidal dispersion.
5. Alkali metal metasilicate such as sodium metasilicate, potassium metasilicate and commercial dry granular sodium and potassium silicates. Heating may be required to start the curing reaction.

6. Water containing 20% to 70% by weight of silica sol.
7. Activators (catalysts) which act as curing agents and are added to the polyurethane or polyurethane prepolymer in the amount of 0.001% to 10% by weight. They may be added in water.
   (a) Tertiary amines, e.g., triethylamine; tributylamine; N-methyl-morpholine; N,N,N',N'-tetramethylenediamine; 1,4-diazobicyclo-(2,2,2)-octane; N-methyl-N'-dimethylaminoethyl piperazine; N,N-dimethylbenzylamine; bis(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-beta-phenylethylamine; and 1,2-dimethylimidazole. Suitable tertiary amine activators which contain hydrogen atoms which are reactive with isocyanate groups include, e.g., triethanolamine; triisopanolamine; N,N-dimethylethanolamine; N-methyldiethanolamine; N-ethyldiethanolamine; and their reactive products with alkylene oxides, e.g., propylene oxide and/or ethylene oxide and mixtures thereof.
   (b) Organo-metallic compounds, preferably organotin compounds such as tin salts of carboxylic acid, e.g., tin acetate, tin octoate, tin ethyl hexoate, and tin laurate and the dialkyl tin salts of carboxylic acids, e.g., dibutyl tin diacetate, dibutyl tin dilaurate, dibutyl tin maleate or diocyl tin diacetate.
   (c) Silaamines with carbon-silicon bonds are desdribed, e.g., in British Pat. No. 1,090,589, may also be used as activators, e.g., 2,2,4-trimethyl-1,2-silamorpholine or 1,3-diethylaminoethyl-tetramethyldisiloxane.
   (d) Other examples of catalysts which may be used according to the invention, and details of their action are described in Kunststoff-Handbuch, Volume VII, published by Vieweg and Hochtlen, Carl-Hanser-Verlag, Munich, 1966, on pages 96 and 102.
8. Water containing 1% to 10% by weight of bases which contain nitrogen such as tetraalkyl ammonium hydroxides.
9. Water containing 1% to 10% by weight of alkali metal hydroxides such as sodium hydroxide; alkali metal phenolates such as sodium phenolate or alkali metal alcoholates such as sodium methylate.
10. Water containing sodium polysulfide in the amount of 1% to 10% by weight.
11. Water containing 20% to 70% by weight of a water-binding agent, being capable of absorbing water to form a solid or a gel, such as hydraulic cement, synthetic anhydrite, gypsum or burnt lime.
12. Mixtures of the above-name curing agents.

Surface-active additives (emulsifiers and foam stabilizers) may also be used according to the invention. Suitable emulsifiers are, e.g., the sodium salts of ricinoleic sulphonates or of fatty acid, or salts of fatty acids with amines, e.g., oleic acid diethylamine or stearic acid diethanolamine. Other surface-active additives are alkali metal or ammonium salts of sulphonic acids, e.g., dodecylbenzine sulphonic acid or dinaphthyl methane disulphonic acid; or of fatty acids, e.g., ricinoleic acid, or of polymeric fatty acids.

The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308. These additives are, preferably, used in quantities of up to 20%, based on the reaction mixture.

Negative catalyst, for example, substances which are acidic in reaction, e.g., hydrochloric acid or organic acid halides, known cell regulators, e.g., paraffins, fatty alcohols or dimethyl polysiloxanes, pigments or dyes, know flame-retarding agents, e.g., tris-chloroethylphosphate or ammonium phosphate and polyphosphates, stabilizers against aging and weathering, pasticizers, fungicidal and bacteriocidal substances and fillers, e.g., barium sulphate, kieselguhr, carbon black or whiting, may also be used according to the invention.

Further examples of surface additives, foam stabilizers, cell regulators, negative catalysts, stabilizers, flame-retarding substances, plasticizers, dyes, fillers and fungicidal and bacteriocidal substances and details about methods of using these additives and their action may be found in Kunststoff-Handbuch, Volume VI, published by Vieweg and Hochtlen, Carl-Hanser-Verlag, Munich, 1966, on pages 103 to 113. The halogenated paraffins and inorganic salts of phosphoric acid are the preferred fire-retarding agents.

Aqueous solutions of silicates may be prepared in the form of 25% to 70% silicates. Silica sols which may have an alkaline or acid pH may also be used; they should have solid contents of 15% to 50%. Silica sols are generally used in combination with aqueous silicate solutions. The choice of concentration depends mainly on the desired end product. Compact materials or materials with closed cells are, preferably, produced with concentrated silicated solutions which, if necessary, are adjusted to a lower viscosity by addition of alkali metal hydroxide. Solutions with concentrations of 40% to 70% by weight can be prepared in this way. On the other hand, to produce open-celled light-weight foams, it is preferred to use silicate solutions with concentrations of 20% to 45% by weight in order to obtain low viscosities, sufficiently long reaction times and low unit weights. Silicate solutions with concentrations of 15% to 45% are also preferred when substantial quantities of finely divided inorganic fillers are used.

Suitable flame-resistant compounds may be used in the products of this invention such as those which contain halogen or phosphorus, e.g., tributylphosphate; tris(2,3-dichloropropyl)-phosphate; polyoxypropylene-chloromethylphosphonate; cresylidiphenylphosphate; tricresylphosphate; tris-(beta-chloroethyl)-phosphate; tris-(2,3-dichloropropyl)-phosphate; triphenylphosphate; ammonium phosphate; perchloroinated diphenyl phosphate; perchlorinated terephenyl phosphate; hexabromocyclodecane; tribromophenol; dibromopropyldiene; hexabromobenzene; octabromodiphenylether; pentabromotoluol; polytribromostyrol; tris-(bromocresyl)-phosphate; tetrabromobis-phenol A; tetrabromophthalic acid anhydride; octabromodiphenyl phosphate; tri-(dibromopropyl)-phosphate; calcium hydrogen phosphate; sodium or potassium dihydrogen phosphate; disodium or dipotassium hydrogenphosphate; ammonium chloride, phosphoric acid; polyvinylchloride tetomers chloroparaffins as well as further phosphorus- and/or halogen-containing flame-resistant compounds as they are described in Kunststoff-Handbuch, Volume VII, Munich, 1966, pages 110 and 111, which are incorporated herein by reference. The organic halogen-containing components are, however, preferred in the polyurethane products.

The ratios of the essential reactants and optional reactants which lead to the polyurethane resinous or foamed product of this invention may vary, broadly speaking, with ranges as follows:

(a) 1 to 95 parts by weight of polyester resinous product, preferably with free hydroxyl group and produced by the process of this invention;
(b) 50 parts by weight of polyisocyanate, polyisocyanate or isocyanate-terminated polyurethane prepolymer;
(c) up to 20% by weight of a foam stabilizer;
(d) up to 50% by weight of a chemically inert blowing agent, boiling within the range of from $-25°$ C. to $80°$ C.;
(e) up to 10% by weight of an activator;
(f) up to 200 parts by weight of a water-binding agent;
(g) up to 95 parts by weight of a polyol.

Percentages are based on the weight of the reactants, polyester resinous product, polyol and polyisocyanate.

In the cases where the viscosity of the polyisocyanate is too high, it may be reduced by adding a low-viscosity isocyanate, or even by adding inert solvents such as acetone, diethyl ether of diethylene glycol, ethyl acetate and the like.

In cases where the curing agent contains an aqueous alkali silicate, the isocyanate-terminated polyurethane prepolymer may be sulphonated. It is usually sufficient to react the isocyanate-terminated polyurethane prepolymer with concentrated sulphuric acid or oleum of sulfur trioxide in order to produce a sulphonated poly(urethane silicate) prepolymer containing the sulphonic group in the amount of 3 to 100 milli-equivalents/100 g. The reaction will take place by thoroughly mixing the sulphuric acid or oleum or sulfur trioxide with the isocyanate-terminated polyurethane prepolymer at ambient temperature and pressure. In some cases where sulfur trioxide is used, an increased pressure is advantageous. The polyisocyanate may be modified to contain ionic groups before reacting with the polyester resinous products.

The sulphonated isocyanate-terminated polyurethane prepolymer can be directly mixed with an aqueous silicate solution, in which case the corresponding metal salt is formed in situ. The sulphonated polyurethane prepolymer may be completely or partly neutralized at the onset by the addition of amines metal alcoholates, metal oxides, metal hydroxide or metal carbonates.

Water-binding components may be used in this invention, including organic or inorganic water-binding substances which have, first, the ability to chemically combine, preferably irreversibly, with water and, second, the ability to reinforce the poly(urethane silicate) plastics of the invention. The term "water-binding component" is used herein to identify a material, preferably granular or particulate, which is sufficiently anhydrous to be capable of absorbing water to form a solid or gel such as mortar of hydraulic cement.

A water-binding component such as hydraulic cement, synthetic anhydrides, gypsum or burnt lime may be added to any of the components to produce a tough, somewhat flexible solid or cellular solid concrete. The water-binding component may be added in amounts from 0 to 200% by weight, based on the weight of the reactants. When a water-binding agent is added and when the curing agent is an aqueous alkali metal silicate solution, a halogen- or phosphorus-containing compound or mixture thereof may be added in the amount of 1% to 30% by weight, based on the weight of the reactants.

Suitable hydraulic cements are, in particular, Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate, may be used. There are many kinds of cement which can be used in the production of the compositions of the invention and they are so well known that a detailed description of cement will not be given here; however, one can find such a detailed description in Encyclopedia of Chemical Technology, Volume 4, Second Edition, published by Kirk-Othmer, pages 684 to 710, of the type of cement which may be used in the production of this invention and which are incorporated herein by reference.

Blowing agents may be used to improve or increase the foaming to produce cellular solid plastics such as acetone, ethyl acetate, methanol, ethanol, halogenated alkanes, e.g., methylene chloride, chloroform, ethylidene chloride, vinylidene chloride, monofluorotrichloromethane, chlorodifluoromethane, butane, hexane or diethyl ether. Compounds which decompose at temperatures above room temperature with liberation of gases, e.g., nitrogen, such as azo compounds, azoisobutyric acid nitrile, may also act as blowing agents. Compressed air may act as a blowing agent. Other examples of blowing agents and details of the use of blowing agents are described in Kunststoff-Handbuch, Volume VII, published by Vieweg and Hochtlen, Carl-Hanser-Verlag, Munich, 1966, e.g., on pages 108 and 109, 453 to 455 and 507 to 510.

The proportions of the components may be adjusted to a highly cellular solid. When water is used, it reacts with the NCO group to produce $CO_2$ and pores are produced in the product by the evolved $CO_2$. In certain cases, the $CO_2$ is rapidly evolved and escapes before the product hardens, and a solid product can be produced, nearly completely free of air cells. When a high silicate content, from 80% to 99% by weight, is desirable, such as when the final product is required to have mainly the properties of an inorganic silicate plastic, in particular, high-temperature resistance and complete flame resistance, an alkali metal silicate may be added with copolymer or polyol or be reacted with the polyisocyanate to produce a polyurethane prepolymer. In that case, the function of the polyisocyanate is that of a non-volatile hardener whose reaction product is a high-molecular-weight polymer which reduces the brittleness of the product.

When an alkali catalyst or alkali metal silicate is used in the invention, fine metal powders, e.g., powdered calcium, magnesium, aluminum or zinc, may also act as the blowing agents by bringing about the evolution of hydrogen. Compressed air may be mixed in the components and may also be used to mix the components, then be used as the blowing agent. These metal powders also have a hardening or reinforcing effect.

The properties of the foams (cellular solid) obtained from any given formulation, e.g., their density in the moist state, depends to some extent on the details of the mixing process, e.g., the form and speed of the stirrer and the form of the mixing chamber, and also the selected temperature at which foaming is started. The foams will usually expand 3 to 12 times their original volume.

The polyurethane plastics produced by the invention have many uses. The reaction mixture, with or without a blowing agent, may be mixed in a mixing apparatus; then the reaction mixture may be sprayed by means of compressed air or by the airless spraying process onto surfaces; subsequently, the mixture expands and hardens in the form of a cellular solid which is useful for insulation, filling, and moisture-proofing coating. The foaming material may also be forced, poured or injection-molded into cold or heated molds, which may be relief molds or solid or hollow molds, optionally by centrifugal casting, and left to harden at room temperature or at temperatures up to 200° C., at ambient pressure or at elevated pressure. In certain cases, it may be necessary to heat the mixing or spraying apparatus to initiate foaming; then, once foaming has started, the heat evolved by the reaction between components continues the foaming until the reaction is complete. A temperature between 40° C. and 150° C. may be required in order to initiate foaming. The blowing agent may be added to the polyisocyanate or polyester resinous product.

Reinforcing elements may quite easily be incorporated into the reaction mixtures. The inorganic and/or organic reinforcing elements may be, e.g., fibers, metal wires, foams, fabrics, fleeces or skeletons. The reinforcing elements may be mixed with the reaction mixtures, for example, by the fibrous web impregnation or by processes in which the reaction mixtures and reinforcing fibers are together applied to the mold, for example, by means of a spray apparatus. The shaped products obtainable in this way may be used as building elements, e.g., in the form of sandwich elements, either as such or after they have been laminated with metal, glass or plastics; if desired, these sandwich elements may be formed. The products may be used as hollow bodies, e.g., as containers for goods which may be required to be kept moist or cool, as filter materials or exchanges, as catalyst carriers or carriers of other active substances, as decorative elements, furniture components and fillings or for cavities. They may be used in the field of model building and mold building, and the production of molds for metal casting may also be considered.

Instead of blowing agents, finely divided inorganic or organic hollow particles, e.g., hollow expanded beads of glass, plastics and straw, may be used for producing cellular solid products. These products may be used as insulating materials, cavity fillings, packaging materials, building materials which have good solvent resistance and advantageous fire-resistant characteristics. They may also be used as lightweight building bricks in the form of sandwiches, e.g., with metal-covering layers for house building and the construction of motor vehicles and aircraft.

Organic or inorganic particles which are capable of foaming up or have already been foamed may be incorporated in the fluid foaming reaction mixture, e.g., expanded clay, expanded glass, wood, cork, popcorn, hollow plastic beads such as beads of vinyl chloride polymers, polyethylene, styrene polymers, or foam particles of these polymers or other polymers, e.g., polysulphone, polyepoxide, polyurethane, poly(urethane silicate) copolymers, urea-formaldehyde, phenol-formaldehyde or polyimide polymers, or, alternatively, heaps of these particles may be permeated with foaming reaction mixtures to produce insulation materials which have good fire-resistant characteristics.

The cellular solid products of the invention, in the aqueous or dry or impregnated state, may subsequently be lacquered metallized, coated, laminated, galvanized, vapor-treated, bonded or blocked. The cellular solid products may be sawed, drilled, planed, polished, or other working processes may be used to produce shaped products. The shaped products, with or without a filler, may be further modified in their properties by subsequent heat treatment, oxidation processes, hot pressing, sintering processes or surface melting or other compacting processes.

The novel cellular solid products of the invention are also suitable for use as constructional materials due to their toughness and stiffness, yet they are still elastic. They are resistant to tension and compression and have a high-dimensional stability to heat and high flame resistance. They have excellent sound-absorption capacity, heat-insulating capacity, fire resistance, and heat resistance which makes them useful for insulation. The cellular products of this invention may be foamed on the building site and, in many cases, used in place of wood or hard fiber boards. Any hollow forms may be used for foaming. The brittle foams may be crushed and used as filler, as a soil conditioner, as a substrate for the propagation of seedlings, cuttings and plants or cut flowers.

The foamed or solid concrete produced by reaction of the organic broken-down lignin cellulose polymer, polyol and polyisocyanate with a water-binding component may be used as surface coatings having wood adhesion and resistance-to-abrasion properties, as mortars, and for making molded products, particularly in construction engineering and civil engineering such as for building walls, igloos, boats and for roadbuilding, etc. These products are light-weight, thermal-insulating materials with excellent mechanical properties and fire resistance. The amount of water-binding component used varies greatly, depending on the type of product desired, up to 200% by weight, based on weight of reactants. In certain cases, it is desirable to add sand and gravel in the amount of 1 to 6 parts by weight to each part by weight of the hydraulic cement. The mixture may be poured in place, troweled on or sprayed onto the desired surface to produce a solid or cellular solid product.

Fillers in the form of powders, granules, wire, fibers, dumb-bell-shaped particles, crystallites, spirals, rods, beads, hollow beads, foam particles, non-woven webs, pieces of woven or knitted fabrics, tapes and pieces of foil of solid inorganic or organic substances, e.g., dolomite, chalk, alumina, asbestos, basic silicic acids, sand, talc, iron oxides, aluminum oxide and hydroxides, alkali metal silicates, zeolites, mixed silicates, calcium silicate, calcium sulphates, aluminosilicates, cements, basalt wool or powder, galss fibers, carbon fibers, graphite, carbon black, Al-, Fe-, Cri- and Ag-powders, molybdenum sulphide, steel wool, bronze or copper meshes, silicon powder, expanded clay particles, hollow glass beads, glass powder, lava and pumice particles, wood chips, woodmeal, cork, cotton, straw, popcorn, coke or particles of filled or unfilled, foamed or unfoamed, stretched or unstretched organic polymers, may be added to the mixture of the Components (a), (b) and (c) in many applications. Among the numerous organic polymers which may be used, e.g., as powders, granules, foam particles, beads, hollow beads, foamable (but not-yet-foamed) particles, fibers, tapes, woven fabrics, or fleeces, the following may be mentioned as examples: Polystyrene, polyethylene, polypropylene, polyacrylonitrile, polybutadiene, polyisoprene, polytetrafluorethylene, aliphatic and aromatic polyesters, melamine, urea, phenol resins, phenol silicate resins, polyacetal resins, polyepoxides, polyhydantoins, polyureas, polyethers, polyurethanes, polyimides, polyamides, polysulphones, polycarbonates and copolymers thereof.

The composite materials, according to the invention, may be mixed with considerable quantities of fillers without losing their advantageous properties, and, in particular, composite materials which consist predominantly of organic constituents which are preferably filled with inorganic fillers; where silicate constituents predominate, it is, preferably, filled with organic fillers. Fillers which are particularly preferred are chalk, talc, dolomite, gypsum, clay, anhydrite, glass, carbon and the conventional plastics and rubber waste.

In the production of surface coatings, bonds, putties or interlayers, particularly in the case of porous materials, it is preferred to use polyisocyanates which have only a low isocyanate content, e.g., less than 5%, or prepolymers which are free from isocyanate groups. The mixtures obtained in this way have a long pot life and may be applied in thin layers which gradually harden in the course of time. The liberated $CO_2$ acts as the curing agent. In a two-stage or multistage hardening in which, for example, an excess of water is used, there is a rapid evolution of $CO_2$ and the polyurethane silicon acid resinous product is converted into a workable form which may be used as putties, coating agents, grouting materials or mortar. This thermoplastic form may also be injection-molded, extruded or worked up in a kneader.

In many cases, the polyurethane resinous and foamed products produced by the invention are soluble in organic solvents and may be used as a tough coating agent for wood and metal. The mixtures of the invention are also suitable for use as impregnating agents for finishing fibers. The mixtures may also be extruded through dies or slots and be converted into fibers and foils. These fibers and foils may be used for producing synthetic incombustible paper or fleeces.

When the polyester resinous product produced by the process of this invention and polyisocyanate are combined with expanded clay and an alkali metal silicate solution, a very good concrete is obtained which can, for example, be used as panels in the construction field. In this case, the foam material (expanded clay) plays the part of the binding material.

The object of this invention is to provide a novel process for the production of a polyester resinous product. Another object is to produce a novel polyester resinous product. Another object is to produce a novel polyester resinous product that will react with polyisocyanates to produce useful polyurethane foams and solid resinous products. Another object is to produce novel unsaturated polyester resinous products.

DETAILED DESCRIPTION OF THE INVENTION

I have discovered that a polyester resinous product may be produced by mixing 10 to 50 parts by weight of a broken-down alkali metal lignin-cellulose polymer, 10 to 50 parts by weight of a substituted organic hydroxy compound and a polycarboxylic acid and/or a polycarboxylic acid anhydride, heating the mixture to just below the boiling temperature of the reactants, then gradually increasing the temperature up to 250° C. while agitating for from 30 minutes to 4 hours.

The reaction of this invention may take place under any suitable physical condition. While most of the reactions will take place at ambient pressure, in certain cases, a pressure either lower than, or above, ambient pressure may give the best result. It may be preferable in certain cases to use temperature above the substituted organic hydroxy compound's boiling temperature after a partial reaction has taken place in order to speed up the chemical reaction. The temperature usually ranges between 150° C. and 250° C., when the substituted organic compound is a gas, elevated pressures are necessary.

The polyester resinous product may be modified by the addition of the following components to the mixture of broken-down alkali metal lignin-cellulose polymer, substituted organic hydroxy compound and polycarboxylic acid and/or polycarboxylic acid anhydride:

(a) up to 25 parts by weight of an organic polyhydroxy compound when 50 parts by weight of polycarboxylic acid or polycarboxylic acid anhydride are utilized;

(b) up to 50% by weight of a vinyl monomer, percentage based on polyester resinous product;

(c) up to 25 parts by weight of an aldehyde when 50 parts by weight of broken-down alkali metal lignin-cellulose polymer are used.

(d) up to 25 parts by weight of a substituted organic compound when 50 parts by weight of broken-down alkali metal lignin-cellulose polymer are used;

(e) up to 50% by weight of the polycarboxylic acid and/or polycarboxylic acid anhydride may be replaced with a vegetable oil;

(f) up to 25 parts by weight of water when 50 parts by weight of the broken-down alkali metal lignin-cellulose are used.

The unsaturated polyester resinous product will react with vinyl monomers in the presence of an initiator. The vinyl monomer may be added in an amount up to 50% by weight, percentage based on the polyester resinous product. Any suitable peroxide initiator may be used, usually an amount of 0.2% to 0.5% by weight being a catalytic amount, percentage based on weight of the polyester resinous product. Any suitable activator may be used to activate the peroxide initiator, in an amount of 30 to 100 ppm.

The polyester resinous products of this invention will react with polyisocyanates and polyisothiocyanates to produce foamed and solid polyurethane resinous products. The reaction will take place in any suitable physical conditions. The reactions will usually take place at ambient temperature or pressure, but in certain cases, an elevated or lowered temperature or pressure is preferred.

DESCRIPTION OF PREFERRED EMBODIMENTS

My invention will be illustrated in greater detail by the specific examples which follow, it being understood that these preferred embodiments are illustrative of, but not limited to, procedures which may be used in the production of polyester products. Parts and percentages are by weight unless otherwise indicated.

EXAMPLE 1

About 2 parts by weight of fir sawdust and 1.5 parts by weight of melted sodium hydroxide flakes (lye) are mixed, then heated to between 150° C. and 220° C. while agitating at ambient pressure for 5 to 60 minutes or until the mixture softens and expands into a brown, thick liquid which solidifies on cooling, thereby producing a broken-down sodium lignin-cellulose polymer.

EXAMPLE 2

About 2 parts by weight of small plant particles listed below and 2 parts by weight of melted sodium hydroxide in the form of caustic soda are mixed, then heated to between 150° C. and 220° C. while agitating at ambient pressure, with care being taken to avoid burning the mixture, for 5 to 60 minutes; the mixture begins to expand and a brown, thick, liquid, broken-down sodium lignin-cellulose polymer is produced. The liquid solidifies on cooling and is ground into a powder. The powder is soluble in water, alcohols, polyhydric organic compounds and other solvents.

|     |     |     |     |
| --- | --- | --- | --- |
| (a) | Oak sawdust; | (g) | Cotton stalks; |
| (b) | Fir sawdust; | (h) | Bagasse; |
| (c) | Ash sawdust; | (i) | Equal parts paper and fir sawdust; |
| (d) | Seaweed; | (j) | Oat straw; |
| (e) | Equal parts cotton and fir sawdust; | (k) | Grass clippings. |
| (f) | Corn cobs; | | |

EXAMPLE 3

About 1 part by weight of melted lye flakes (NaOH) and 2 parts by weight of fir sawdust are mixed, then heated to between 150° C. and 220° C. while agitating at ambient pressure, with care being taken that the mixture does not burn, for 5 to 60 minutes or unitl the mixture softens and expands into a dark-brown, thick liquid when hot. It cools to a solid, thereby producing a broken-down alkali metal plant polymer which is water-soluble and has lost a $CO_2$ radical per molecule.

Other plant particles may be used in place of fir sawdust, such as:

|     |     |     |     |
| --- | --- | --- | --- |
| (a) | Oak sawdust; | (h) | Paper; |
| (b) | Ash sawdust; | (i) | Oat straw; |
| (c) | Seaweed; | (j) | Grass clippings; |
| (d) | Cotton; | (k) | Pine sawdust; |
| (e) | Corn cobs; | (l) | Equal parts of paper and fir sawdust. |
| (f) | Cotton stalks; | | |
| (g) | Bagasse; | | |

4 parts by weight of the broken-down alkali metal plant polymer are mixed with 4 parts by weight of an aqueous solution containing 37% formaldehyde, then heated to between 70° C. and 100° C. while agitating for 30 to 120 minutes, thereby producing alkali metal formaldehyde lignin-cellulose polymer.

EXAMPLE 4

About equal parts by weight of melted sodium hydroxide in the form of caustic soda and a plant particle listed below are mixed, then heated to between 150° C. and 220° C. while agitating at ambient pressure for 5 to 60 minutes or until the mixture softens and expands into a thick, brown liquid which solidifies on cooling, thereby producing a broken-down alkali metal plant polymer. The polymer is ground into small particles.

|     |     |     |     |
| --- | --- | --- | --- |
| (a) | Fir sawdust; | (j) | Equal mixture of (a) and cotton; |
| (b) | Oak sawdust; | | |
| (c) | Beech sawdust; | (k) | Pine sawdust; |
| (d) | Redwood sawdust; | (l) | Maple sawdust; |
| (e) | Gum sawdust; | (m) | Elm sawdust; |
| (f) | Sigmore sawdust; | (n) | Corn cob particles; |
| (g) | Cotton stalk particles; | (o) | Seaweed particles; |
| (h) | Mixture of weed particles; | (p) | Cornstalk particles; |
| | | (q) | Bugasse particles; |
| (i) | Equal mixture of (a) and newspapers; | (r) | Mixtures thereof. |

About 2 parts by weight of the broken-down alkali metal plant polymer and 1 part by weight of acetaldehyde are mixed, then heated to between 70° C. and 100° C. while agitating for 30 to 120 minutes, thereby producing alkali metal acetaldehyde lignin-cellulose polymer.

EXAMPLE 5

About equal parts by weight of melted potassium hydroxide and a plant particle selected from the list below are mixed, then heated to between 150° C. and 220° C. while agitating at ambient pressure for 5 to 60 minutes or until the mixture softens and expands, thereby producing alkali metal lignin-cellulose polymer.

EXAMPLE 6

About 10 parts by weight of broken-down alkali metal lignin-cellulose as produced in Example 2b are dissolved in ethanol, then butane-1-hydrogen sulfate is slowly added, in an amount wherein the hydrogen sulfate radicals are about equal to the sodium radicals, while agitating for about 30 minutes. The reaction is complete in 30 minutes to 8 hours, thereby producing a brown organic lignin-cellulose polymer.

Other substituted organic compounds may be used in place of butane-1-hydrogen sulfate such as para chlorobenzene; 2-nitrotoluene; 1-chloro-2-propanol; methyl sulfate; 1,1-bromopropane; ethyl sulfate; 1-bromo-2-butene; ethylene chlorohydrin; ethyl hydrogen sulfate; dichloroacetic acid; p-chlorobenzyl and mixtures thereof.

EXAMPLE 7

About 10 parts by weight of the broken-down sodium lignin-cellulose polymer as produced in 2b and 10 parts by weight of polyethylene glycol (mol. wt. 380 to 420) are mixed and heated until the polymer goes into solution; then ethyl chloride is slowly added in an autoclave at 1000 to 1500 psi in an amount wherein the chlorine atoms about equal the sodium atoms while agitating at a temperature between 150° C. and 200° C. for about 30 minutes, thereby producing an ethyl lignin-cellulose polymer.

EXAMPLE 8

The broken-down alkali lignin-cellulose polymer produced in Example 2f is mixed with ethyl acetate in about equal amounts while agitating for about 30 minutes, thereby producing a broken-down organic lignin-cellulose polymer. The polymer is recovered by filtration.

EXAMPLE 9

Propane -1-dihydrogen phosphate is slowly added to a broken-down alkali metal cellulose polymer as produced in Example 2h in an amount wherein the phosphate radicals are about equivalent to the sodium radicals while agitating at a temperature just below the boiling temperature of the reactants for 30 minutes. The reaction is complete in 30 minutes to 8 hours, thereby producing a propyl lignin-cellulose polymer.

EXAMPLE 10

About 3 parts by weight of a broken-down alkali metal lignin-cellulose, as produced in Example 2f are ground into a fine powder, then bis-monochloroacetic acid, in the amount wherein the chlorine atoms are about equal to the sodium atoms in the mixture, is slowly added while agitating at a temperature just below the boiling temperature of monochloroacetic acid for about 30 minutes. The reaction is complete in 30 minutes to 8 hours, thereby producing a carboxymethyl lignin-cellulose polymer.

EXAMPLE 11

About 10 parts by weight of the broken-down sodium lignin-cellulose polymer as produced in Example 1, 10 parts by weight of ethylene chlorohydrin and 15 parts by weight of phthalic anhydride are mixed, then heated to just below the boiling temperature of ethylene chlorohydrin while agitating and the temperature is slowly increased to about 200° C. while continuing to agitate for from 30 minutes to 4 hours, thereby producing a brown, solid, polyester resinous product and salt.

EXAMPLE 12

About 10 parts by weight of the broken-down sodium lignin-cellulose polymer as produced in Example 2a, 10 parts by weight of ethylene chlorohydrin, 5 parts by weight of phthalic anhydride, 5 parts by weight of adipic acid and 5 parts by weight of maleic acid are mixed, then slowly heated to just below the boiling point of the reactants; then, as the boiling point is elevated, the mixture is heated at about 220° C. while agitating for from 30 minutes to 4 hours, thereby producing an unsaturated polyester resinous product and salt.

EXAMPLE 13

About 10 parts by weight of broken-down sodium lignin-cellulose polymer as produced in Example 2i, 5 parts by weight of ethylene chlorohydrin, 5 parts by weight of glycerine, $\alpha$, $\gamma$ dichlorohydrin, by parts by weight of phthalic anhydride and 10 parts by weight of linseed oil are mixed, then heated to just below the boiling temperature of the reactants while agitating and gradually increasing the temperature up to 220° C., continuing to agitate for 30 minutes to 4 hours, thereby producing a brown, solid polyester resinous product and salt.

EXAMPLE 14

About 10 parts by weight of the broken-down sodium lignin-cellulose polymer as produced in Example 2e, 10 parts by weight of ethylene chlorohydrin, 5 parts by weight of propylene glycol, 10 parts by weight of maleic anhydride, 5 parts by weight of phthalic anhydride and 10 parts by weight of adipic acid are mixed, then heated to a temperature just below the boiling temperature of propylene glycol, with a slow increase in the temperature up to 220° C. while agitating for from 30 minutes to 4 hours; thereby producing a brown, solid polyester resinous product.

EXAMPLE 15

About 20 parts by weight of the polyester resinous product as produced in Example 14, while at about 90° C., are mixed with 10 parts by weight of styrene, thereby producing a liquid unsaturated polyester resinous product.

About 25 to 100 ppm of cobalt, in the form of cobalt naphthanate, are mixed with 20 parts by weight of the liquid unsaturated polyester resinous product, then 0.2% to 0.5% by weight of methyl ethyl ketone peroxide, percentage based on polyester resinous product, is added to the mixture, agitating well. The mixture is then applied to multiple layers of fiberglas and cures in from 30 minutes to 2 hours, thereby producing a polyester panel which may be used in construction, boats, aircraft, etc.

EXAMPLE 16

About 10 parts by weight of the sodium formaldehyde lignin-cellulose polymer as produced in Example 3, 5 parts by weight of chloroacetic acid, 10 parts by weight of broken-down lignin-cellulose as produced in Example 2b, 10 parts by weight of ethylene chlorohydrin, 5 parts by weight of glycerol, 10 parts by weight of phthalic anhydride and 10 parts by weight of adipic acid are mixed, then heated to just below the boiling temperature of the reactants while agitating, then gradually increasing the temperature to 220° C. for from 30 minutes to 4 hours, thereby producing a brown, solid polyester resinous product.

The polyester resinous product may be molded by heat and pressure to produce useful objects such as knobs, panels, art objects, etc.

EXAMPLE 17

About 20 parts by weight of the broken-down sodium lignin-cellulose polymer as produced in Example 2b, 20 parts by weight of ethylene chlorohydrin, 5 parts by weight of trimethylol ethane and 5 parts by weight of allyl chloride are mixed, then 10 parts by weight of phthalic anhydride, 5 parts by weight of adipic acid and 10 parts by weight of xylene are added. The mixture is placed in a reactor with a reflux condenser, then heated to about 150° C. while agitating. As the reaction proceeds, the temperature is gradually increased up to 250° C. and the mixture is agitated for from 30 minutes to 4 hours, thereby producing a brown, semi-solid polyester resinous product.

EXAMPLE 18

About 100 parts by weight of the polyester resinous product as produced in Example 17 are mixed with 100 parts by weight of a polyisocyanate listed below. The mixture slowly hardens to form a brown, solid polyurethane product.

| Example | Polyisocyanate |
|---|---|
| a | Tolylene diisocyanate; |
| b | Methylene bis-phenyl diisocyanate; |
| c | 4,4-diphenylmethylene diisocyanate; |
| d | Polyphenyl polymethylene-isocyanate (crude MDI) with an NCO content by weight of 31; |
| e | Equal parts by weight of tolylene diisocyanate |

| Example | Polyisocyanate |
|---|---|
| | and polyphenyl polymethylene-isocyanates with an NCO content by weight of about 31. |

EXAMPLE 19

Example 18 is modified wherein 5 parts by weight of ethylene chloride, 5 parts by weight of trichlorotrifluoroethane, 0.5 part by weight of triethanolamine, 0.5 part by weight of triethylamine, 0.1 part by weight of tin octoate and 0.5 part by weight of a silicone surfactant (L-5420 produced by Union Carbide) are mixed with the polyester resinous product, then reacted with the selected polyisocyanate, thereby producing a rigid polyurethane foam product.

EXAMPLE 20

Example 18 is modified wherein 10 parts by weight of aqueous sodium silicate ($SiO_2$:NaO ratio of 2:1 and containing 40% solids) are mixed with the polyester resinous product, then reacted with the polyisocyanate, thereby producing a polyurethane silicate product.

EXAMPLE 21

Example 19 is modified wherein 25 parts by weight of a 60%-by-weight aqueous sodium silicate solution, with an $SiO_2$:NaO ratio of 1.6:1, are added with the components of Example 19, then mixed with the selected polyisocyanate, thereby producing a rigid polyurethane silicate foam product.

EXAMPLE 22

About 100 parts by weight of the polyester resinous product as produced in Example 14 and 100 parts by weight of an isocyanate-terminated polyurethane prepolymer listed below are mixed and slowly reacted to produce a solid polyurethane product.

| Example | Isocyanate-terminated polyurethane prepolymer |
|---|---|
| a | Polyphenyl-polymethylene-isocyanates with an NCO content of about 31 reacted with 5% acetic acid; |
| b | Polyphenyl-polymethylene-isocyanates with an NCO content of about 31 reacted with 1% propylene glycol; |
| c | Polyphenyl-polymethylene-isocyanates with an NCO content of about 31 reacted with 2% polypropylene glycol (mol. wt. 380); |
| d | Toluene diisocyanate with polypropylene glycol (mol. wt. 500) in an NCO/OH ratio of 25:1; |
| e | Diisocyanato-diphenylmethane with a tetra-functional polypropylene glycol (mol. wt. 500) to produce a prepolymer having about 22% NCO groups; |
| f | Toluene diisocyanate with castor oil to produce a prepolymer with an NCO content of about 15%; |
| g | Toluene diisocyanate with a hydroxyl-group-containing polysulfide polymer to produce a prepolymer with an NCO content of about 12%; |
| h | Methylene bis-phenol diisocyanate with a liquid polyepichlorohydrin to produce a prepolymer of about 16%, and 25% by weight of a resin extender, polyalphamethyl-styrene, are added, percentage based on weight of prepolymer; |
| i | Tolylene diisocyanate with a polyester (4 mols of glycerol, 2.5 mols of adipic acid and 0.5 mol of phthalic anhydride) to produce a prepolymer with an NCO content of about 23%; |
| j | Tolylene diisocyanate with polyethylene glycol (mol. wt. 2000) to produce a prepolymer with an NCO content of about 28%. |

EXAMPLE 23

Example 22 is modified wherein 10 parts by weight of trichlorofluoromethane, 0.5 part by weight of triethylenediamine, 0.05 part by weight of tin octoate, 1 part by weight of sodium doctyl sulfosuccinate and 0.5 part by weight of a silicone surfactant (L-5420 produced by Union Carbide) are mixed with the polyester resinous product of Example 22, then mixed and reacted at ambient temperature and pressure, thereby producing a polyurethane foam.

EXAMPLE 24

Claim 18 is modified wherein 50 parts by weight of a surcose amine polyol (mol. wt. about 2000) and 50 parts by weight of Portland cement are added with the polyester resinous product, then 100 parts by weight of Portland cement are mixed with the polyisocyanate listed. The components are mixed, thereby producing a polyurethane product.

EXAMPLE 25

About 25 parts by weight of the polyester resinous product as produced in Example 11, 50 parts by weight of amine sucrose polyol (mol. wt. 2000), 25 parts by weight of an aqueous sodium silicate solution containing 60% solids ($SiO_2$:NaO ratio of 1.6:1), 1 part by weight of a silicone surfactant (L-5420 produced by Union Carbide) and 0.2 part by weight of tin diacetate are thoroughly mixed, then 100 parts by weight of Portland cement are admixed with the mixture, then 100 parts by weight of a phosgenation product of aniline-formaldehyde condensation, with an NCO content of about 31%, are added and thoroughly mixed. The mixture expands to produce a rigid, foamed polyurethane concrete.

Other water-binding agents may be used in place of Portland cement, such as other hydraulic cements, burnt lime, gypsum and synthetic anhydrites.

EXAMPLE 26

Example 13 is modified wherein 3 parts by weight of water are added to the broken-down sodium lignin-cellulose.

EXAMPLE 27

About 100 parts by weight of the unsaturated polyester resinous product in styrene as produced in Example 15, 0.1 part by weight of cobalt naphthanate, 0.2 part by weight of benzoyl peroxide, 0.2 part by weight of methyl ethyl ketone, 10 parts by weight of trichlorotrifluoroethane, 0.5 part by weight of a silicone surfactant (L-5420 produced by Union Carbide) and 1 part by weight of triethylenediamine are mixed, then the mixture is mixed with 100 parts by weight of 4,4-diphenylmethane diisocyanate. The mixture begins to expand in from 30 to 120 seconds, thereby producing a rigid polyurethane foam.

EXAMPLE 28

About 25 parts by weight of the broken-down sodium lignin-cellulose polymer as produced in Example 21, 10 parts by weight of aqueous solution containing 37% formaldehyde by weight, 5 parts by weight of ethyl hydrogen sulfate, and 10 parts by weight of ethylene chlorohydrin are mixed and reacted at ambient temperature and pressure for about 30 minutes, then 30 parts by weight of phthalic anhydride are added and the mixture is heated to about 150° C. while agitating; then the temperature is gradually increased to about 220° C. The reaction is complete in from 30 minutes to 4 hours, thereby producing polyester resinous product.

Other substituted compounds may be used in place of ethyl hydrogen sulfate such as ethyl sulfate, ethylene chloride, vinylidene chloride, methyl methacrylate, vinyl acetate, acetic anhydride, sodium chloroacetate, chloroform, methylene chloride, 1-nitropropane, dichloroacetic acid, methyl allyl chloride, allyl chloride, methyl acetate, trichloromesitylene, trichlorobutylene oxide, epichlorohydrin, methyl octalate and mixtures thereof.

Although specific materials and conditions were set forth in the above Examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended Claims.

I claim:

1. The process for the production of polyester resinous products by mixing, heating and reacting the following components:
   (a) a broken-down alkali metal lignin-cellulose polymer and/or a broken-down cellulose polymer produced by mixing 3 parts by weight of a cellulose-containing plant or plant derivative with 2 to 5 parts by weight of melted alkali metal hydroxide, then heating the mixture at 150° C. to 220° C. while agitating for 5 to 60 minutes; in an amount of 10 to 50 parts by weight;
   (b) a substituted organic hydroxy compound, which contains at least one substituent which will split off in the reaction, in an amount of 10 to 50 parts by weight;
   (c) polycarboxylic acid or polycarboxylic acid anhydride, or mixtures thereof, in an amount of 10 to 50 parts by weight.

2. The process of claim 1 wherein the substituted organic hydroxy compound is a halohydrin compound selected from the group consisting of ethylene chlorohydrin, ethylene bromohydrin, glycerine, α,γ-dichlorohydrin and mixtures thereof.

3. The process of claim 1 wherein the polycarboxylic acid is selected from the group consisting of maleic acid, phthalic acid, succinic acid, oxalic acid, malonic acid, glutaric acid, adipic acid, pimelic acid, azelaic acid, suberic acid, isophthalic acid, fumaric acid, sebacic acid, terephthalic acid, itaconic acid, diglycolic acid and mixtures thereof.

4. The process of claim 1 wherein the polycarboxylic acid anhydride is selected from the group consisting of phthalic acid anhydride, maleic acid anhydride, succinic acid anhydride, glutaric acid anhydride, poly(adipic anhydride), tetrachlorophthalic acid anhydride, pyromellitic and anhydride, tetrohydrophthalic acid anhydride, dodecenylsuccinic acid anhydride, hexadecylsuccinic acid anhydride, nitrophthalic acid anhydride and mixtures thereof.

5. The process of claim 1 wherein up to 50% by weight of the polycarboxylic acid or polycarboxylic acid anhydride is replaced with a vegetable oil, selected from the group consisting of soybean oil, linseed oil, cottonseed oil, tung oil, fish oil, perilla oil, oiticica oil, sunflower oil, safflower oil, walnut oil, dehydrated castor oil, monoglyceride of vegetable oils and mixtures thereof.

6. The product produced by the process of claim 1.

7. The product produced by the process of claim 5.

8. The process of claim 1 wherein up to 25 parts by weight of a polyhydroxy organic compound are mixed and reacted with Components (a), (b) and (c).

9. The process of claim 8 wherein the polyhydroxy organic compound is selected from the group consisting of ethylene glycol, diethylene glycol, propylene glycol, butylene glycol, trimethylene glycol, tetramethylene glycol, pentamethylene glycol, hexamethylene glycol, polyethylene glycol, polypropylene glycol, Bisphenol A, resorcinol, glycerol, glycerol monochlorohydrin, trimethylol ethane and mixtures thereof.

10. The process according to claim 1, wherein an additional step is taken wherein a catalytic amount of a peroxide initiator; selected from the group consisting of acetyl benzoyl peroxide, peracetic acid, methyl ethyl ketone peroxide, cyclohexanone peroxide, cyclohexyl hypoperoxide, 2,4-dichlorobenzoyl peroxide, cumene hypoperoxide, tert-butyl hydroperoxide, methyl amyl ketone peroxide, lauroyl peroxide, benzoyl peroxide, tert-butyl perbenzoate, di-tert-butyl diperphthalate, p-chlorobenzoyl peroxide; dibenzol diperoxide and mixtures thereof, is admixed with the polyester resinous product.

11. The process of claim 1 wherein an additional step is taken wherein a vinyl monomer, selected from the group consisting of vinyl acetate, styrene, methacrylic acid, methyl methacrylate, vinyl toluene, acrylic acid, acrylonitrile, divinyl benzene and mixtures thereof, in an amount of up to 50% by weight, percentage based on polyester resinous product, is admixed with the polyester resinous product of claim 1, then a catalytic amount of a peroxide initiator and activator is added and is thoroughly mixed and reacted.

12. The product produced by the process of claim 11.

13. The process of claim 11 wherein the peroxide initiator is methyl ethyl ketone peroxide in the amount of 0.2% to 0.5% by weight, percentage based on weight of polyester resinous product, and the activator is cobalt naphthanate in the amount of 30 to 100 ppm of cobalt metal.

14. The process of claim 1 wherein an organic compound selected from the group consisting of formaldehyde, substituted organic compound polyol, vegetable oils, and mixtures thereof, is added with Components (a), (b) and (c).

15. The product produced by the process of claim 14.

16. The process of claim 14 wherein the substituted organic compound having a substituent which will split off during the reaction to said broken-down alkali metal lignin-cellulose and/or a broken-down cellulose polymer in the amount wherein the mols of the substituted radicals are about equal to the mols of the alkali radicals in the mixture, the substituent containing at least one substituent selected from the group consisting of acid sulfate, nitrate, sulfate, acid phosphate, bicarbonate, formate, acetate, propionate, laurate, oleate, stearate, oxalate, acid malonate, acid tartrate, acid citrate, halogens and mixtures thereof.

17. The process of claim 1 wherein up to 25 parts by weight of water is added to the broken-down alkali metal lignin-cellulose or broken-down alkali metal cellulose.

* * * * *